(12) United States Patent
Schwarze et al.

(10) Patent No.: US 7,786,871 B2
(45) Date of Patent: Aug. 31, 2010

(54) RADIO FREQUENCY IDENTIFICATION DEVICES WITH SEPARATED ANTENNAS

(75) Inventors: Stephan Schwarze, Austin, TX (US); Cynthia C. Rubio-Ratton, Austin, TX (US); Kenneth L. Ratton, Austin, TX (US)

(73) Assignee: Radiant RFID, L.L.C., Austin, TX (US)

( * ) Notice: Subject to any disclaimer, the term of this patent is extended or adjusted under 35 U.S.C. 154(b) by 303 days.

(21) Appl. No.: 11/752,810

(22) Filed: May 23, 2007

(65) Prior Publication Data

US 2008/0291026 A1   Nov. 27, 2008

(51) Int. Cl.
G08B 13/14 (2006.01)
(52) U.S. Cl. .................... 340/572.7; 340/572.1
(58) Field of Classification Search .......... 340/572.7, 340/572.1, 572.4, 572.5, 572.8, 10.1
See application file for complete search history.

(56) References Cited

U.S. PATENT DOCUMENTS

| | | | |
|---|---|---|---|
| 5,493,805 A | 2/1996 | Penuela et al. | |
| 5,574,470 A * | 11/1996 | de Vall | 340/572.7 |
| 5,799,426 A | 9/1998 | Peterson | |
| 5,914,862 A * | 6/1999 | Ferguson et al. | 340/572.7 |
| 5,973,598 A | 10/1999 | Beigel | |
| 5,973,600 A | 10/1999 | Mosher, Jr. | |
| 5,979,941 A | 11/1999 | Mosher, Jr. et al. | |
| 6,075,707 A * | 6/2000 | Ferguson et al. | 340/572.7 |
| 6,100,804 A * | 8/2000 | Brady et al. | 340/572.7 |
| 6,181,287 B1 | 1/2001 | Beigel | |
| 6,304,169 B1 * | 10/2001 | Blama et al. | 340/572.7 |
| 6,407,669 B1 * | 6/2002 | Brown et al. | 340/572.1 |
| 6,501,435 B1 * | 12/2002 | King et al. | 340/572.7 |
| 6,782,648 B1 | 8/2004 | Mosher, Jr. | |
| 6,888,502 B2 | 5/2005 | Beigel et al. | |
| 7,071,826 B2 | 7/2006 | Peterson | |
| 7,188,764 B2 | 3/2007 | Penuela | |
| 7,268,687 B2 * | 9/2007 | Egbert et al. | 340/572.7 |
| 2006/0244605 A1 * | 11/2006 | Sakama et al. | 340/572.7 |

* cited by examiner

*Primary Examiner*—John A Tweel, Jr.
(74) *Attorney, Agent, or Firm*—Hamilton & Terrile, LLP; Kent B. Chambers (57) ABSTRACT

An RFID apparatus includes at least two antennas that are positioned to increase the maximum effective range of the RFID device. The RFID apparatus includes an RFID device, and the RFID device includes an antenna connected to a circuit having a transmitter. The second antenna is positioned relative to the RFID device to increase the MER of the RFID apparatus relative to conventional RFID devices while remaining separated (i.e. no direct physical contact) from the RFID device. In at least one embodiment, the second antenna is separated from the RFID device and positioned relative to the RFID device to induce a coupling of a signal to the RFID device. In at least one embodiment, the second antenna is positioned to overlay at least a portion of the circuit of the RFID device. In at least one embodiment, the RFID device is a passive-type RFID device.

37 Claims, 5 Drawing Sheets

RADIO FREQUENCY IDENTIFICATION DEVICES WITH SEPARATED ANTENNAS

BACKGROUND OF THE INVENTION

1. Field of the Invention

The present invention relates in general to the field of radio frequency identification and more specifically to radio frequency identification devices with separated antennas including embodiments with circuit-antenna overlay.

2. Description of the Related Art

Uses and applications of technologies to track objects, including people, products, and animals, are becoming more and more valuable. Hand counting and manual scanning of bar codes have long been used to identify objects and track their activity. However, manual identification processes have significant limitations in terms of tracking a large amount of objects in a short amount of time. Automated radio frequency identification ("RFID") technology has been embraced as an answer to manual identification processes. RFID technology represents an automated identification method that stores and receives data using RFID devices often referred to as RFID tags or RFID transponders.

Figure 1:
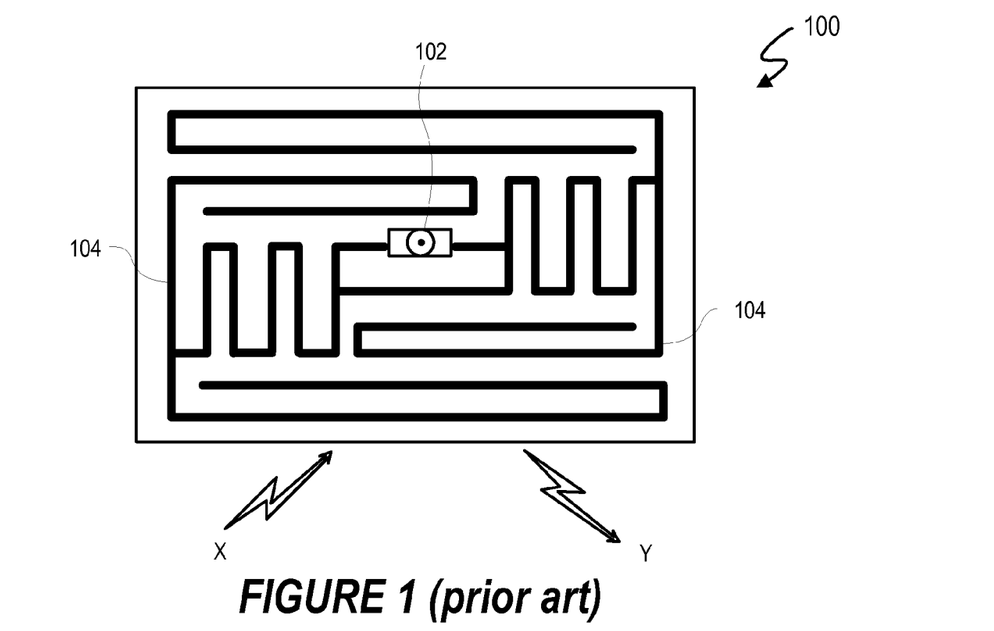
FIG. 1 (labeled prior art) depicts an exemplary radio frequency identification ("RFID") device.

FIG. 1 depicts an exemplary RFID device 100. RFID device 100 is, in at least one embodiment, a transponder that includes a circuit 102. Circuit 102 includes a memory, processor, transmitter, and receiver (see FIG. 3). Circuit 102 is preferably a small, cost effective integrated circuit; although, circuit 102 can be assembled using discrete components. The RFID device 102 also includes an antenna 104 for receiving an input signal X and for transmitting an output signal Y. The memory of circuit 102 stores data, such as an identification code. The processor of circuit 102 detects the input signal X and processes the input signal X by, for example, demodulating the incoming signal X, and modulating an output signal Y that is responsive to the input signal. The output signal Y generally includes the identification code of the RFID device 100 and may also include other data. The transmitter of circuit 102 transmits the data to a receiver by providing electrical signals to antenna 104. Antenna 104 converts the electrical signals into electro-magnetic waves.

The frequency(ies) of the input and output signals are in the radio frequency spectrum. The radio frequency ("RF") spectrum encompasses frequencies in which electromagnetic waves can be generated by alternating current. In at least one embodiment, the RF spectrum ranges from 0+Hz to approximately 300 GHz. Commonly used frequencies for input and output signals are in the ultrahigh frequency range, i.e. 300 MHz-3,000 MHz and are generally modulated to 864 MHz-928 MHz or lower at 13.56 MHz.

RFID devices are categorized as "passive", "semi-passive", and "active". Passive RFID devices have no internal power supply. The small amount of electrical current induced in the antenna 104 by the input signal X provides power for operation of circuit 102. A semi-passive RFID device includes a battery to supply internal power to the circuit 102 but not to transmit the output signal Y. An active RFID device includes an internal power source, such as a battery, that powers the circuit 102 and provides power for transmitting the output signal Y.

Multiple antenna designs exist for RFID devices. The antenna design generally depends on the type of RFID device and the signal frequencies. Antenna 104 represents one antenna design for a passive type RFID device. The antenna 104 extends from both sides of circuit 102. The pattern of antenna 104 is a matter of design choice. Antenna 104 includes a pattern with multiple, square, undulating paths. Antennas can be made using any of a variety of processes, including lithographic processes and wrapped wire. The circuit 102 can be connected to the antenna 104 using any connection technique.

RFID devices can be internally or externally attached to an object. For example, RFID devices can be attached to products, books, passports, transportation passes, vehicles, and animals. For example, RFID devices can be attached to packages to facilitate supply chain management. RFID devices can also be worn by humans, either externally or internally. For example, human worn RFID devices can be used to verify entrance authorization to a particular area or used to track an individuals attendance at different events.

Figure 2:
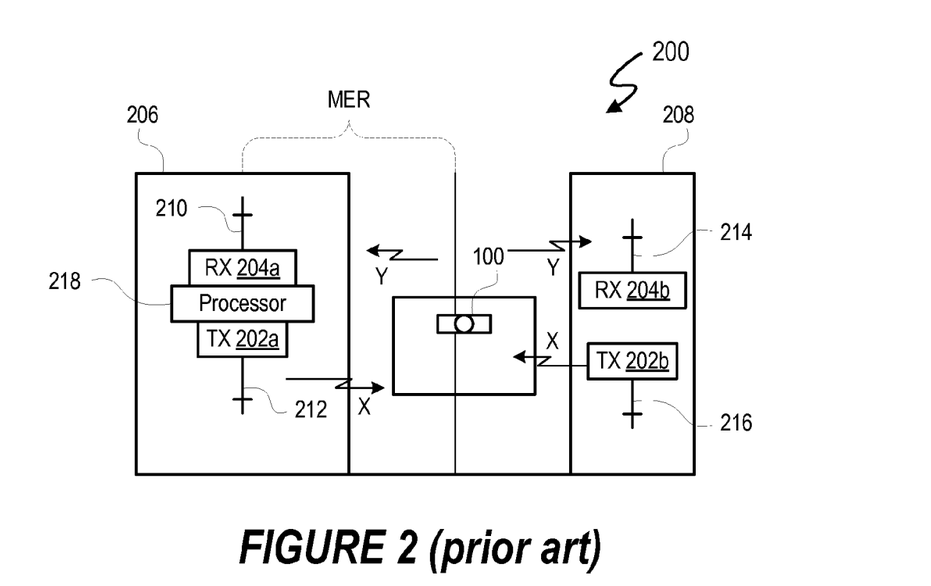
FIG. 2 (labeled prior art) depicts an RFID portal that detects RFID devices.

FIG. 2 depicts an RFID portal 200 that detects RFID devices, such as RFID device 100, as the RFID devices pass within proximity of the antennas of RFID portal. RFID portal 200 is, for example, a DC400 from Symbol Technologies, Inc. a subsidiary of Motorola, Inc. with offices in Oakland, Calif. ("Symbol"). The RFID portal 200 includes two readers 206 and 208. Reader 206 includes RFID portal receiver RX 204a, receiver antenna 210, transmitter TX 202a, and transmitter antenna 212. Reader 208 includes receiver antenna 214 connected to receiver RX 204b and transmitter antenna 216 connected to transmitter TX 202b (connections not shown). The receivers RX 204a and 204b and transmitters TX 202a and 202b are coupled to processor 218. Processor 218 performs various processing function such as modulating an output signal X, demodulating an input signal Y, and retrieving the data transmitted by RFID tag 100. In one embodiment, processor 218 is an XR400 available from Symbol. The transmitter 202 transmits signal X with, for example, 1 watt of power. RFID device 100 responds to the transmitted signal X by transmitting signal Y to receiver 204. The power of signal Y is generally much smaller than the power or signal X and is, for example, approximately 1 microwatt. The maximum effective range ("MER") represents a maximum distance between receiver or transmitter antennas and the RFID device over which the RFID device can be reliably identified by the receiver. The MER varies depending upon, for example, the type of RFID device and the medium upon which the RFID device is placed. Active RFID devices can have an MER of hundreds of meters. The MER of a passive RFID device varies from about 25 centimeters (cm) to a few meters.

The MER of passive RFID devices worn by humans is typically approximately 25 cm. Humans absorb RF radiation at the frequencies used for passive RFID devices and, thus, significantly attenuate the amount of energy available to power the circuit 102 in passive RFID device 100. To effectively gather data from a human-worn, passive RFID device, the wearer must pass within approximately 25 cm of the RFID portal antennas. Generally, positioning the RFID device of the wearer within such close proximity of the RFID portal transmitter and receiver is intrusive to the wearer because the positioning requires conscious effort by the wearer and slows the progress of the wearer. Thus, gathering information using RFID devices for humans is often unreliable due to mispositioning of the RFID device and slow due to the demands of close positioning.

Figure 3:
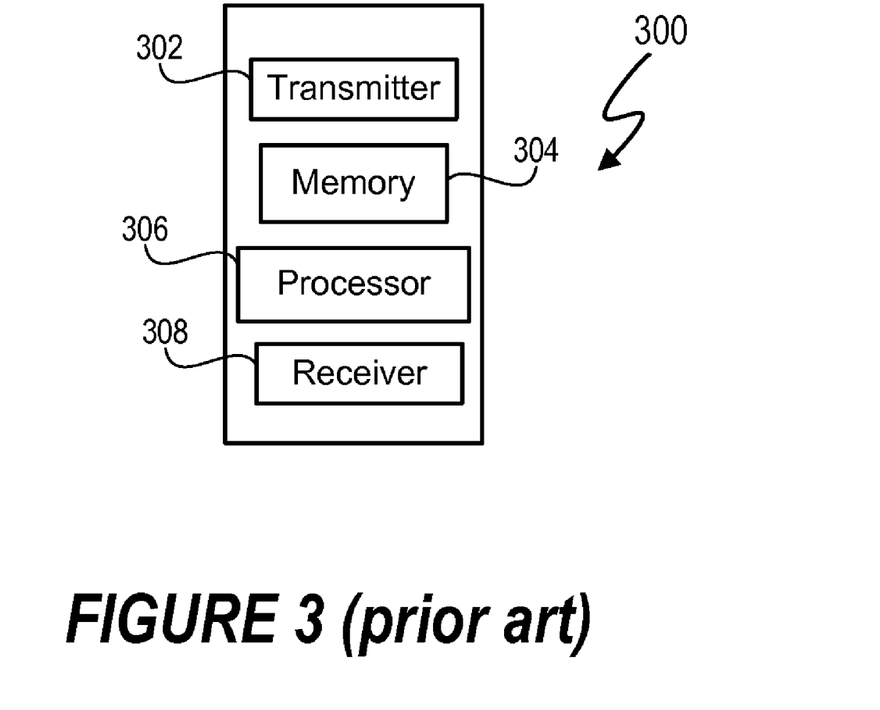
FIG. 3 (labeled prior art) depicts a block diagram of an RFID device circuit.

FIG. 3 depicts a block diagram of circuit 300, which is one example circuit 102. Circuit 300 includes a transmitter 302 for transmitting output signal Y and a memory 304 for storing data, such as an identification code. Circuit 300 also includes a receiver 308 for receiving input signal X and a processor 306 for demodulating input signal X, retrieving data from memory 304 for transmission and modulating output signal Y. In at least one embodiment, the circuit 300 is an integrated circuit that may combine the functions of the transmitter, receiver, processor, and memory. In at least one embodiment, circuit 300 is an integrated circuit with length, width, and height dimensions which vary from, for example, 1-3 mm. Circuit 300 is, for example, EPC Global Gen 2 Higgs Chip available from Alien Technologies Corporation with headquarters in Morgan Hill, Calif., U.S.A.

SUMMARY OF THE INVENTION

In one embodiment of the present invention, an apparatus includes a radio frequency identification (RFID) device having a first antenna coupled to a circuit. The apparatus also includes a second antenna, separated from the RFID device and positioned with respect to the RFID device to induce a current in the RFID device that can be detected by the circuit upon receipt of an input signal.

In another embodiment of the present invention, a radio frequency identification (RFID) device having a first antenna coupled to a circuit. The apparatus also includes a second antenna, separated from the RFID device, having a primary surface overlaying at least a portion of the circuit.

In a further embodiment of the present invention, an apparatus includes a medium and a multiple radio frequency identification (RFID) device secured directly to the medium. Each RFID device includes an antenna, and at least a subset of the RFID devices each include a circuit coupled to the antenna.

In another embodiment of the present invention, a method includes receiving an input signal with a radio frequency identification (RFID) device, wherein the RFID device includes a first antenna coupled to a circuit. The method also includes receiving the input signal with a second antenna and inducing a current in the RFID device with the second antenna upon receipt of the input signal by the second antenna.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An RFID apparatus includes at least two antennas that are positioned to increase the maximum effective range ("MER") of the RFID device. The RFID apparatus includes an RFID device, and the RFID device includes an antenna connected to a circuit having a transmitter. The second antenna is positioned relative to the RFID device to increase the MER of the RFID apparatus relative to conventional RFID devices while remaining separated (i.e. no direct physical contact) from the RFID device. In at least one embodiment, the second antenna is separated from the RFID device and positioned relative to the RFID device to induce a coupling of a signal to the RFID device that can be detected by the RFID device. In at least one embodiment, the second antenna is positioned to overlay at least a portion of the circuit of the RFID device. In at least one embodiment, the RFID device is a passive-type RFID device, and the increased MER of the RFID apparatus facilitates the use of passive-type RFID devices in high traffic flow environments.

Figure 4:
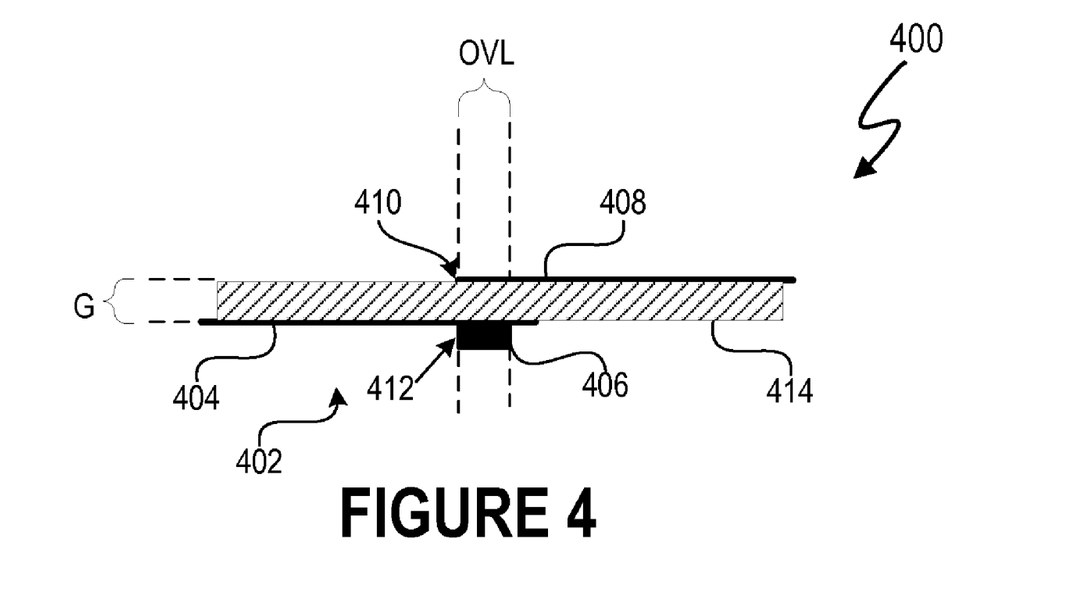
FIG. 4 depicts an RFID apparatus having an RFID device and a separated, overlapping antenna.

FIG. 4 depicts one embodiment of an RFID apparatus 400 with overlaid antennas. The RFID apparatus 400 includes RFID device 402. In at least one embodiment, RFID device 402 can be passive, semi-passive, or active. RFID device 402 includes an antenna 404 connected to a circuit 406. The antenna 404 can be connected to the circuit 406 using chemical or metallic adhesives, a mechanical fastener, including mechanical strapping of the circuit 406 to the antenna 404, or other fastener. In another embodiment, the antenna and circuit are fabricated as one integrated circuit. In at least one embodiment, circuit 406 includes transmitter 302, memory 304, processor 306, and receiver 308 (FIG. 3) and performs the same functions as circuit 102 and is, for example, an EPC Global Gen 2 Higgs Chip available from Alien Technologies Corporation with headquarters in Morgan Hill, Calif., U.S.A. In at least one embodiment, the circuit 406 is an integrated circuit that may combine the functions of the transmitter, receiver, processor, and memory. Circuit 406 can be any circuit configured for use in RFID technologies. In at least one embodiment, the antenna 404 extends primarily in one direction from circuit 406.

RFID apparatus 400 also includes antenna 408. Antenna 408 is positioned with respect to the RFID device 402 to induce a current in the RFID device 402 that can be detected by the circuit 406 in response to an input signal X. The input signal X is a signal that, for example, provides energy to circuit 406, and circuit 406 responds to input signal X by transmitting data, such as an identification code. In at least one embodiment, the input signal X is generated by an RFID portal, such as RFID portal 200.

Antenna 408 is separated from RFID apparatus 402 and overlays at least a portion of circuit 406. "Overlay" ("OVL") represents a relative position between circuit 406 and antenna 408, and the amount of overlay is determined by the position of antenna 408 with respect to circuit 406. In at least one embodiment, overlay represents a relative position between circuit 406 such that, in a flat configuration, a primary surface of antenna 408 lies in a different plane than RFID device 402 and in a curved configuration, the radius of curvature of RFID device 402 is different than the radius of curvature of a primary surface of antenna 408 relative to a common point. In one embodiment, the "primary" surface of antenna 408 represents a surface whose area when viewed perpendicular to the surface is greater than adjoining side and/or end surfaces. In FIG. 3, a side surface of antenna 408 is directed 'out of the page'.

The amount of overlay OVL can be quantified as the percentage of circuit 406 covered by an orthogonally oriented (with respect to a primary surface of antenna 408), imaginary, projected image of antenna 408 onto circuit 406. The amount of overlay OVL can also be quantified as a distance over which antenna 408 extends over circuit 406. The amount of overlay OVL is a matter of design choice and can vary anywhere between just less than 0% and 100%. In at least one embodiment, the amount of overlay is between 75% and 100%. In at least one embodiment, the amount of overlay is between 90% and 100%. The proximal end 410 of antenna 408 can extend beyond the proximal end 412 of circuit 406.

Antenna 408 is separated from circuit 406 by a gap G. In at least one embodiment, gap G can be any value between approximately 0.002 inches and 0.008 inches. The separation of RFID device 402 from antenna 408 is maintained by medium 414. In at least one embodiment, medium 414 functions to provide separation between antenna 408 and RFID device 402 and provide mechanical support to antenna 408 and RFID device 402. In at least one embodiment, medium 414 is a plastic or polyurethane dielectric. Note: the relative dimensions depicted in FIG. 4 are not to scale in order to illustrate various small-scale features such as gap G.

Antennas 404 and 408 can be identical or different. The configuration of antennas 404 and 408 is a matter of design choice and can be any antenna that facilitates a desired MER. The dimensions of antennas are also a matter of design choice and depend upon, for example, the desired cost, MER, and respective input and output frequencies X and Y (FIGS. 1 and 2). The length of the antennas 404 and 408 is generally a fraction of the wavelength λ of respective input and output frequencies X and Y, such as ⅛·λ. In at least one embodiment, wavelength λ=1/902 MHz. Antennas 404 and 408 are made of, for example, any materials in which a current can be induced by an electro-wave. Exemplary antenna materials are copper, aluminum, and metallic inks.

The linear dimension(s) of overlay OVL and dimension(s) of gap G are a matter of design choice. In at least one embodiment, overlay OVL and gap G are empirically determined by exposing the RFID apparatus 402 to an RFID portal, such as RFID portal 200, determining an MER for the current values of OVL and G and repositioning antenna 408 with respect to circuit 406 to vary the amount of gap G and/or overlay OVL between circuit 406 and antenna 408 until an overall maximum effective range is achieved.

Antenna 404 can be fabricated by disposing antenna 404 onto a substrate, using, for example, lithographic technologies or deposition technologies. Antenna 408 can also be fabricated by disposing antenna 408 onto a substrate using, for example, lithographic technologies or deposition technologies. The circuit 406 can be attached to the antenna as previously described. The substrates upon which the antennas 404 and 408 are disposed can be secured to each other to form medium 414.

Figures 5, 6:
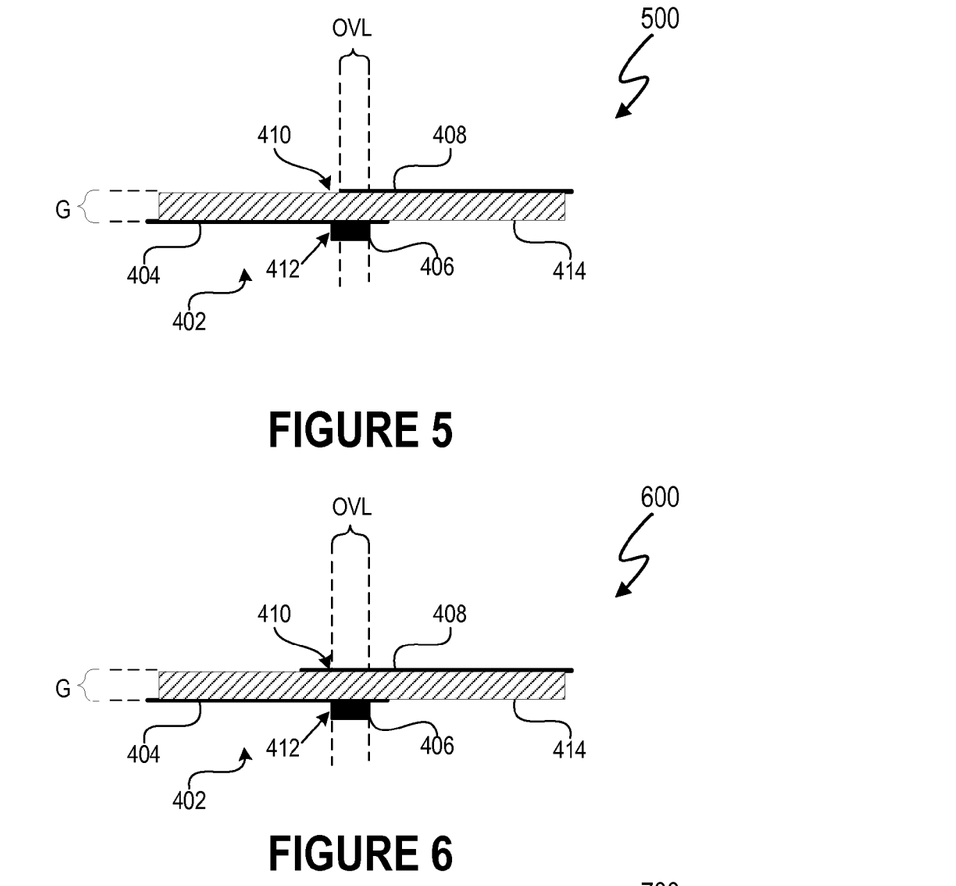
FIGS. 5-7 depict various configurations of an RFID apparatus having an RFID device and a separated, overlapping antenna.

FIG. 5 depicts an RFID apparatus 500 that is identical to RFID apparatus 400 except that the overlap OVL is less than 100% and is approximately 75%.

FIG. 6 depicts an RFID apparatus 600 that is identical to RFID apparatus 400 with an overlap of 100% and part of the antenna 408 extending beyond the proximal edge of circuit 406.

Figure 7:
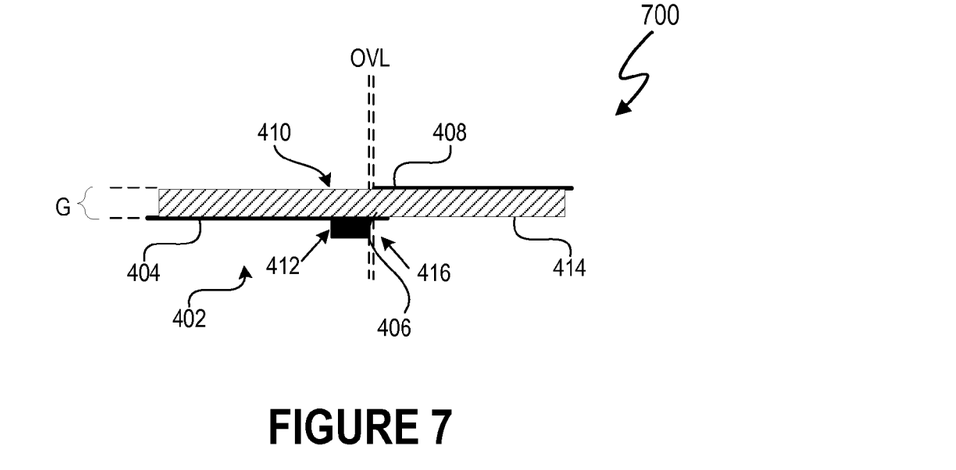

FIG. 7 depicts an RFID apparatus 700 that is identical to RFID apparatus 400 with a negative overlap, i.e. the proximal end of antenna 408 does not overlap the distal end 416 of circuit 406. However, the negative overlap is sufficient to induce a current in RFID device 402 and extend the MER of RFID apparatus 700.

Figure 8A:
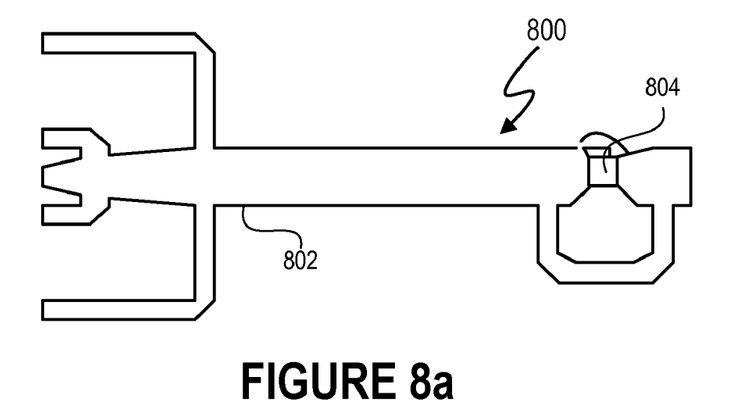
FIG. 8a depicts a plan view of an RFID device.
Figure 8B:
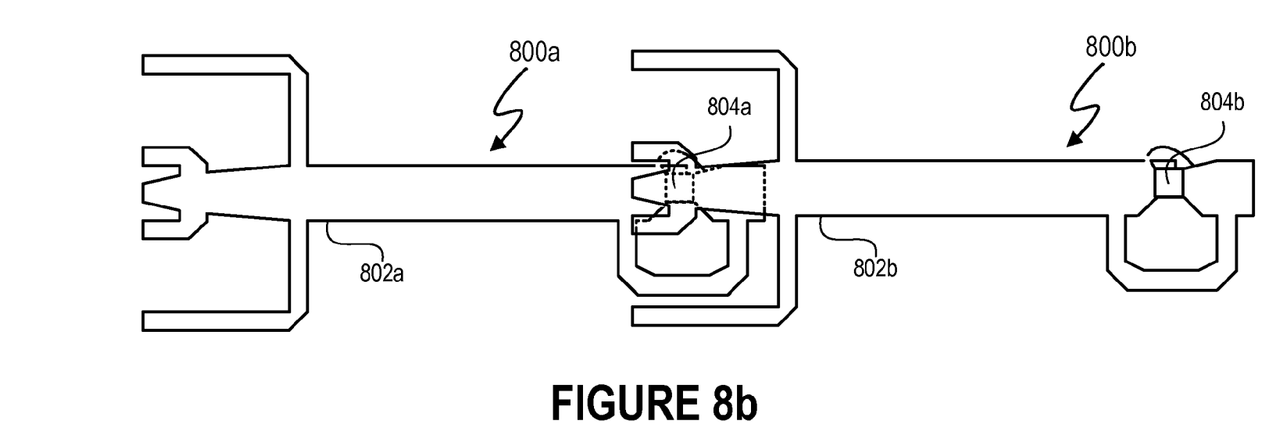
FIG. 8b depicts a plan view of two RFID devices with a circuit-antenna overlap.

FIG. 8a depicts RFID device 800 in a plan view. RFID device 800 represents one embodiment of RFID device 400, and the depiction of RFID device 800 is rotated 90 degrees relative to the depiction of RFID device 400. RFID device 800 includes a trident-configured antenna 802, which represents one embodiment of antenna 404 and, separately, one embodiment of antenna 408. RFID 800 also includes circuit 804, which represents one embodiment of circuit 406. Antenna 802 can be fabricated by disposing antenna 802 onto a substrate (not shown), such as medium 414, using, for example, lithographic technologies or deposition technologies, FIG. 8b depicts two RFID devices 800a and 800b. RFID devices are each identical to RFID device 800. RFID device 800b includes antenna 802b that has a primary surface that overlaps circuit 804a with a 100% overlap.

Figure 9:
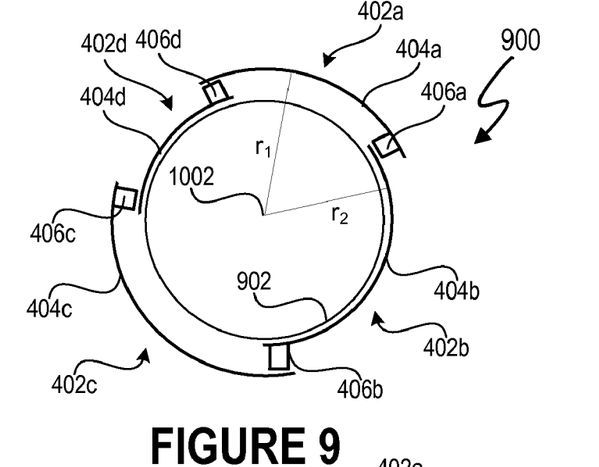
FIGS. 9 and 10 depict a combination RFID apparatus having multiple RFID devices with overlapping antennas.
Figure 10:
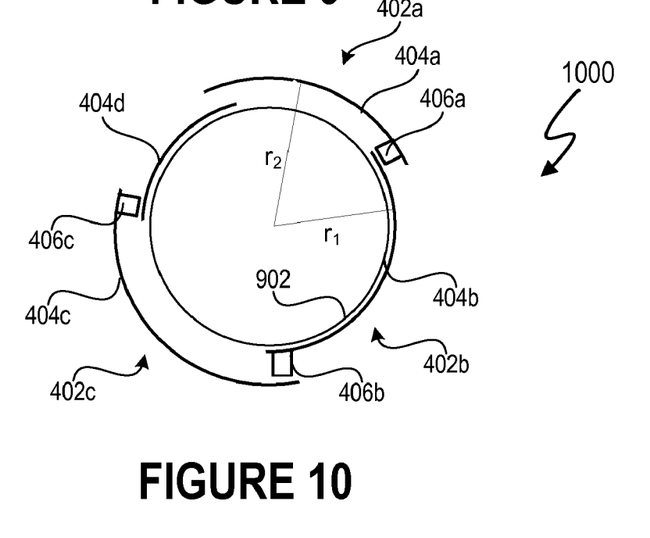

Referring to FIGS. 9 and 10, the RFID apparatus 400 can be included in a package alone, or multiple embodiments of RFID device 402 can be combined to create a combination RFID apparatus. FIG. 9 depicts combination RFID apparatus 900, which is one embodiment of a combination of multiple embodiments of RFID devices 402. The number of multiple embodiments of RFID devices 402 is a matter of design choice. In at least one embodiment, combination RFID apparatus 900 has four (4) RFID devices 402. In another embodiment, different RFID devices are combined to form RFID apparatus 900. For example, a mixture of passive, active, and/or semi-active devices can be included, different amount of overlap OVL can be used, and different antenna designs and materials can be combined. Combination RFID apparatus 900 includes multiple RFID devices 402a, 402b, 402c, and 402d. One distinction between each of the RFID devices 402a, 402b, 402c, and 402d is that the respective antennas 404a, 404b, 404c, and 404d overlaying each circuits 406a, 406b, 406c, and 406d are also connected to one of the circuits 406a, 406b, 406c, and 406d. Each of the overlaying antennas 404a, 404b, 404c, and 404d can receive a transmitted signal X and couple the signal to respective circuits 406a, 406b, 406c, and 406d and induce a signal in respective RFID devices 402d, 402a, 402b, and 402c, underlying the antenna. Each of circuits 406a, 406b, 406c, and 406d is separated from an overlaying antenna by a medium (not shown so as to improve the clarity of FIG. 9), such as medium 414. Circuits 406a, 406b, 406c, and 406d relative to antennas 404a, 404b, 404c, and 404d can be oriented with respect to each other to produce a compact design or oriented to achieve any other design consideration.

The separation and overlay of antennas 404a, 404b, 404c, and 404d with respect to RFID devices 402d, 402a, 402b, and 402c, is demonstrated by referring to the radii of curvature of RFID devices 402a, 402b, 402c, and 402d. The radius of curvature of RFID devices 402a and 402c, is $r_1$, and the radius of curvature of RFID devices 402b and 402d is $r_2$ with respect to a common, imaginary point 902. Radius $r_1$ exceeds the radius $r_2$ to create a separation between antennas 404a, 404b, 404c, and 404d with respect to RFID devices 402d, 402a, 402b, and 402c, of, for example, an amount that can range from, for example, 0.002 inches to 0.008 inches. The exact amount of separation can vary depending upon, for example, the desired MER and the particular power requirements and capabilities of circuits 406a, 406b, 406c, and 406d.

FIG. 10 depicts another embodiment of a combination RFID apparatus 1000. RFID apparatus 1000 is identical to RFID apparatus 900 except that RFID apparatus 1000 uses one fewer circuit by eliminating circuit 406d.

Referring to FIGS. 9 and 10, RFID apparatus 900 and RFID apparatus 1000 can each be configured as a wristband with an inner medium 902 that rests against the wrist of a wearer. The inner medium 902 is made of, for example, plastic, paper, or polyurethane. In at least one embodiment, a protective covering (not shown) is also attached on the outside of RFID apparatus 900 and RFID apparatus 1000. By including multiple RFID devices in RFID apparatus 900 and RFID apparatus 1000, in at least one embodiment, particular positioning of the wristband on the wearer's wrist is unnecessary.

In at least one embodiment, both RFID apparatus 900 and RFID apparatus 1000 are passive. Using the EPC Global Gen 2 Higgs Chip and antenna 802 in the configuration of apparatus 1000, a transmission frequency by an RFID portal of 864 MHz to 928 MHz, and a transmission power of approx. 1 W, the RFID apparatus 900 has been demonstrated to have an MER of approximately 2 meters when worn on a human wrist. The RFID apparatus 1000 has exhibited these characteristics with curved antennas.

Because of the relatively large MER of passive embodiments of apparatus 1000, RFID apparatus 1000 can be used in high traffic flow environments and does not rely on any conscious positioning by the wearer to place the RFID apparatus within a few centimeters of the RFID portal.

Figure 11:
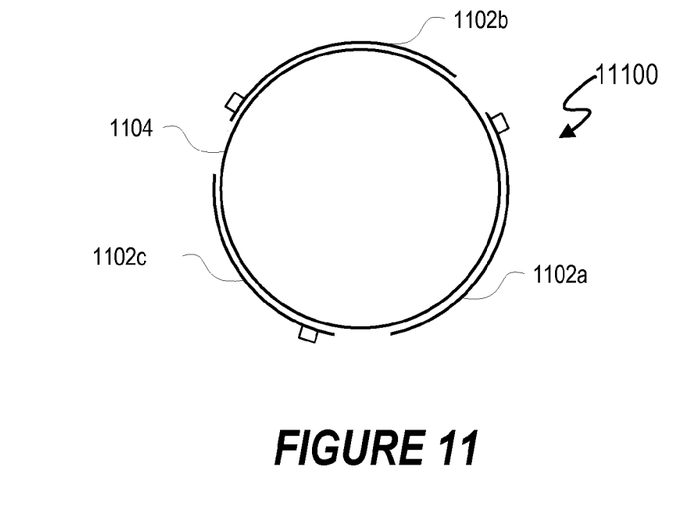
FIG. 11 depicts a combination RFID apparatus.

FIG. 11 depicts a combination RFID apparatus 1100 with multiple RFID devices 1102a, 1102b, and 1102c. RFID devices 1102a, 1102b, and 1102c are each identical to RFID device 402 (FIG. 5) and are secured, preferably directly, to a medium 1102. The medium 1104 can be any material, such as plastic or polyurethane. Preferably the medium 1104 is non-conductive. The RFID devices 1102a, 1102b, and 1102c can be secured using, for example, an adhesive or other type of chemical or metallic adhesives, mechanical fastener, or other fastener. Preferably, the medium 1104 is separate from the object being tracked by the RFID apparatus 1100. Preferably, the medium 1104 to which each RFID device 1102a, 1102b, and 1102c is attached is the same and continuous.

The combination RFID apparatus 1100 can be configured in closed pattern, such as the circular pattern depicted in FIG. 11 or in an open pattern, such as a linear pattern. The medium 1104 can be secured to an object using any securing devices, such as adhesives or fasteners, or by forming a closed loop around an object. Using multiple RFID devices 1102a, 1102b, and 1102c reduces orientation problems incurred with individual RFID devices. For example, combination RFID device can be configured as a wristband. A wristband often revolves around a human wrist if the wristband is not sufficiently, and often uncomfortably, tightened on the wrist. Using multiple RFID devices 1102a, 1102b, and 1102c on a wristband reduces orientation problems incurred with individual RFID devices.

Although the present invention has been described in detail, it should be understood that various changes, substitutions and alterations can be made hereto without departing from the spirit and scope of the invention as defined by the appended claims.

What is claimed is:

1. An apparatus comprising:
a first radio frequency identification (RFID) device having a first antenna and a first circuit coupled to the first antenna; and
a second RFID device having a second antenna and a second circuit coupled to the second antenna, wherein the second antenna is separated from both the first RFID device and the first antenna and positioned with respect to the first RFID device to induce a current in the first RFID device that can be detected by the first circuit upon receipt of an input signal.

2. The apparatus of claim 1 further comprising:
multiple, additional RFID devices, wherein each additional RFID device includes a separate antenna coupled to a circuit, and each of the antennas of at least a subset of the additional RFID devices is positioned with respect to another one of the RFID devices to induce a current in the RFID device that can be detected by the circuit of the RFID device upon receipt of an input signal.

3. The apparatus of claim 1 wherein the RFID devices are configured into a wristband.

4. The apparatus of claim 1 wherein the first RFID device and the second antenna are disposed in separate planes.

5. The apparatus of claim 1 wherein the first antenna is positioned with the respect to the second RFID device to induce a current in the second RFID device that can be detected the second circuit upon receipt of the input signal.

6. The apparatus of claim 1 wherein the first circuit comprises a processor, a memory, and a transmitter and the second circuit comprises a processor, a memory, and a transmitter.

7. The apparatus of claim 1 wherein the second antenna is positioned to increase a maximum effective range of the first RFID device.

8. The apparatus of claim 1 wherein the second antenna includes a primary surface overlaying at least a portion of the first circuit.

9. The apparatus of claim 8 wherein the primary surface of the second antenna is separated from the first RFID device by a gap distance X, and $0.002 \text{ inches} \leq X \leq 0.008 \text{ inches}$.

10. The apparatus of claim 8 wherein the primary surface of the second antenna overlays between 0% to, and including, 100% of the first circuit of the first RFID device.

11. The apparatus of claim 1 further comprising a medium fastened to the first RFID device and the second antenna.

12. The apparatus of claim 11 wherein the medium is a member of the group consisting of plastic and polyurethane.

13. The apparatus of claim 1 wherein the first and second RFID devices are passive.

14. An apparatus comprising:
a first radio frequency identification (RFID) device having a first antenna and a first circuit coupled to the first antenna; and
a second RFID device having a second antenna and a second circuit coupled to the second antenna, wherein the second antenna is separated from both the first RFID device and the first antenna, and the second antenna includes a primary surface overlaying at least a portion of the first circuit.

15. The apparatus of claim 14 further comprising:
multiple, additional RFID devices, wherein each additional RFID device includes a separate antenna coupled to a circuit, and each of the antennas of at least a subset of the RFID devices include a primary surface that overlays at least a portion of another one of the RFID devices.

16. The apparatus of claim 15 wherein the RFID devices are configured into a wristband.

17. The apparatus of claim 15 wherein the first RFID device and the second antenna are disposed in separate planes.

18. The apparatus of claim 14 wherein the first antenna includes a primary surface overlaying at least a portion of the second circuit.

19. The apparatus of claim 14 wherein the first circuit comprises a processor, a memory, and a transmitter and the second circuit comprises a processor, a memory, and a transmitter.

20. The apparatus of claim 14 further comprising a medium disposed between the first RFID device and the second antenna.

21. The apparatus of claim 20 wherein the medium is a member of the group consisting of plastic and polyurethane.

22. The apparatus of claim 14 wherein the second antenna is positioned to increase a maximum effective range of the first RFID device.

23. The apparatus of claim 14 wherein the primary surface of the second antenna overlays between 0% to, and including, 100% of the first circuit of the first RFID device.

24. The apparatus of claim 14 wherein the first and second RFID devices are passive.

25. The apparatus of claim 14 wherein the primary surface of the second antenna is separated from the first RFID device by a gap distance X, and 0.002 inches$\leq$X$\leq$0.008 inches.

26. A method comprising:
   receiving an input signal with a first radio frequency identification (RFID) device, wherein the RFID device includes a first antenna and a first circuit coupled to the first antenna;
   receiving the input signal with a second RFID device, wherein the second RFID device includes a second antenna and a second circuit coupled to the antenna, and the second antenna is separated from both the first RFID device and the first antenna;
   inducing a current in the first RFID device with the second antenna upon receipt of the input signal by the second antenna.

27. The method of claim 26 further comprising:
   receiving the input signal with at least one of multiple, additional RFID devices, wherein each additional RFID device includes a separate antenna coupled to a circuit, and each of the antennas of at least a subset of the RFID devices is positioned with respect to another one of the RFID devices to induce a current in the RFID device that can be detected by the circuit of the RFID device upon receipt of the input signal.

28. The method of claim 26 wherein the second antenna includes a primary surface overlaying at least a portion of the first circuit.

29. The method of claim 28 wherein the primary surface of the second antenna is separated from the first RFID device by a gap distance X, and 0.002 inches$\leq$X$\leq$0.008 inches.

30. The method of claim 28 wherein the primary surface of the second antenna overlays between 0% to, and including, 100% of the first circuit of the first RFID device.

31. The method of claim 26 wherein the first and second RFID devices are passive.

32. The method of claim 26 wherein the first antenna is positioned with the respect to the second RFID device to induce a current in the second RFID device that can be detected the second circuit upon receipt of the input signal.

33. The method of claim 27 wherein the first circuit comprises a processor, a memory, and a transmitter and the second circuit comprises a processor, a memory, and a transmitter.

34. The apparatus of claim 1 wherein the input signal is modulated to an ultrahigh frequency range.

35. The apparatus of claim 34 wherein the input signal is modulated to 864 MHz-928 MHz.

36. The apparatus of claim 14 wherein the first and second antennas are configured to receive an input signal modulated to an ultrahigh frequency range.

37. The apparatus of claim 36 wherein the input signal is modulated to 864 MHz-928 MHz.

* * * * *